US006175855B1

United States Patent
Reich et al.

(10) Patent No.: US 6,175,855 B1
(45) Date of Patent: Jan. 16, 2001

(54) METHOD FOR INSTANTIATING A CLASS HAVING DIFFERENT VERSIONS

(75) Inventors: Matthias Reich, Munich; Steffen Seidler, Stendal, both of (DE)

(73) Assignee: Siemens Aktiengesellschaft, Munich (DE)

( * ) Notice: Under 35 U.S.C. 154(b), the term of this patent shall be extended for 0 days.

(21) Appl. No.: 08/968,666

(22) Filed: Nov. 12, 1997

(30) Foreign Application Priority Data

Dec. 20, 1996 (DE) .............................................. 196 53 557

(51) Int. Cl.$^7$ .......................... G06F 15/16; G06F 15/173
(52) U.S. Cl. ......................... 709/202; 709/223; 709/317
(58) Field of Search ..................................... 709/202, 208, 709/211, 217, 218, 221, 223, 248, 303, 313, 314, 315, 316, 317; 395/701, 703, 706; 707/10, 100, 103, 203

(56) References Cited

U.S. PATENT DOCUMENTS

| 5,317,688 | | 5/1994 | Watson et al. . | |
|---|---|---|---|---|
| 5,404,525 | * | 4/1995 | Endicott et al. | 395/702 |
| 5,421,016 | * | 5/1995 | Conner et al. | 395/707 |
| 5,499,365 | * | 3/1996 | Anderson et al. | 707/203 |
| 5,551,029 | * | 8/1996 | Jagadish et al. | 707/103 |
| 5,555,418 | * | 9/1996 | Nilsson et al. | 709/305 |
| 5,557,793 | * | 9/1996 | Koerber | 707/103 |
| 5,630,066 | * | 5/1997 | Gosling | 709/221 |
| 5,630,135 | * | 5/1997 | Orimo et al. | 709/106 |
| 5,659,736 | * | 8/1997 | Hasegawa et al. | 707/100 |
| 5,684,984 | * | 11/1997 | Jones et al. | 707/10 |
| 5,692,195 | * | 11/1997 | Conner et al. | 709/305 |
| 5,710,894 | * | 1/1998 | Maulsby et al. | 345/326 |
| 5,729,744 | * | 3/1998 | Gerken et al. | 707/203 |
| 5,764,992 | * | 6/1998 | Kullick et al. | 395/712 |
| 5,774,723 | * | 6/1998 | Endicott et al. | 717/2 |
| 5,794,030 | * | 8/1998 | Morsi et al. | 707/103 |
| 5,802,367 | * | 9/1998 | Held et al. | 709/305 |
| 5,802,524 | * | 9/1998 | FLowers et al. | 707/103 |
| 5,862,325 | * | 1/1999 | Reed et al. | 395/200.31 |
| 5,867,709 | * | 2/1999 | Klencke | 395/702 |
| 5,905,987 | * | 5/1999 | Shutt et al. | 707/103 |
| 5,978,577 | * | 11/1999 | Rierden et al. | 707/10 |

FOREIGN PATENT DOCUMENTS 0 747 811    11/1996   (EP) .

OTHER PUBLICATIONS

"Intelligent Agents: An Emerging Technology for Next Generation Telecommunications?"–Magedanz et al—INFOCOM '96, Mar. 24–28, 1996, San Francisco CA, USA, p. 1–9.
Getting Started with Java—p.3–9 (no Filing Date).

* cited by examiner

Primary Examiner—Zarni Maung
Assistant Examiner—Jason D. Cardone
(74) Attorney, Agent, or Firm—Schiff Hardin & Waite

(57) ABSTRACT

In a method for instantiating a class having different versions defined in an object-oriented programming language, updating of objects in a network for the running time of the system is enabled. Objects having different versions, above all software agents, are therefore instantiated. A distinction is made between the instantiation with different versions of an object, the updating of classes having different versions, and the updating of the platform, which provides operating software for the software agents. Applications of the method include Internet, network management, Java, and generally networked and/or distributed systems.

7 Claims, 3 Drawing Sheets

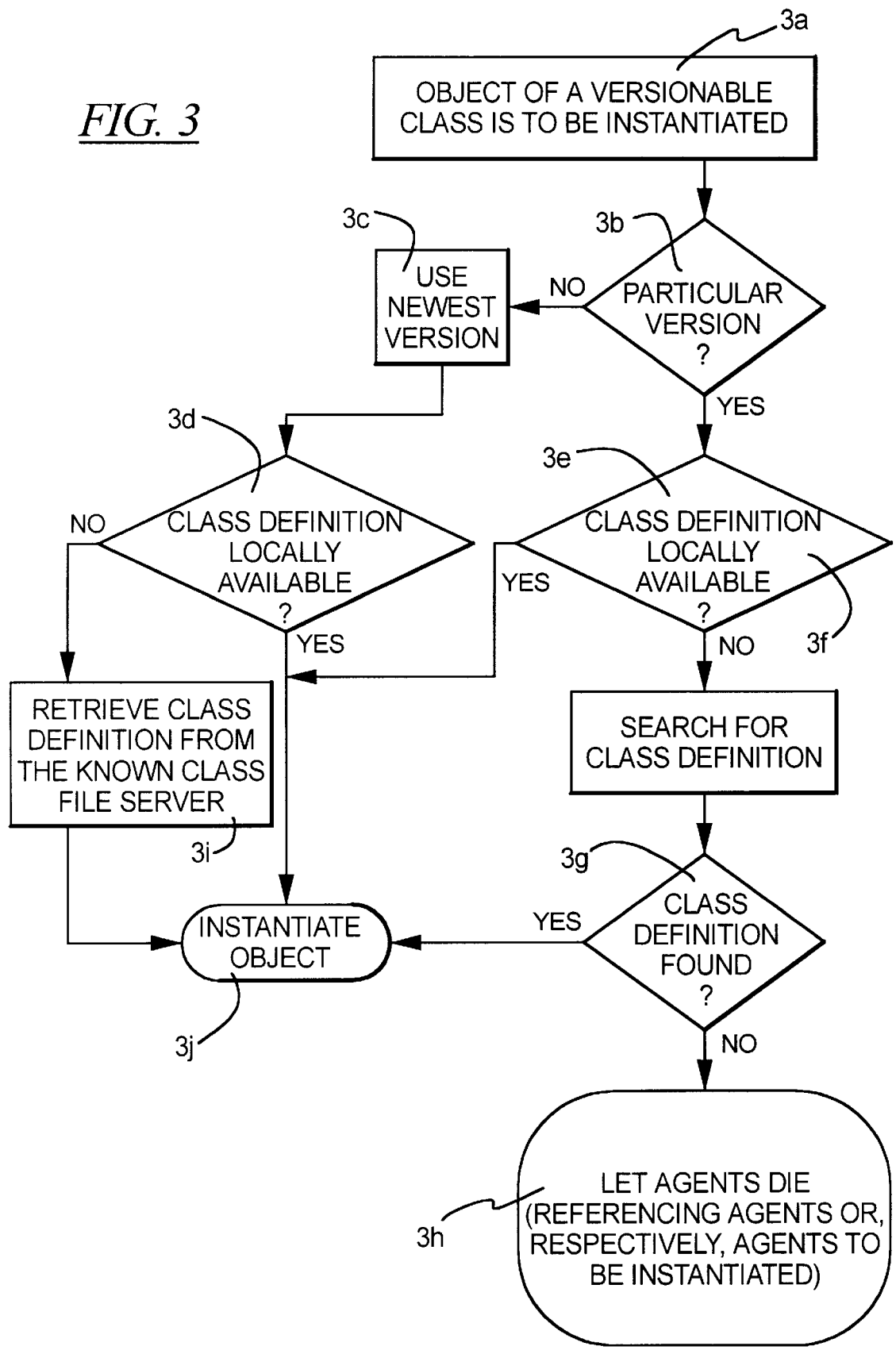

METHOD FOR INSTANTIATING A CLASS HAVING DIFFERENT VERSIONS

BACKGROUND OF THE INVENTION

The invention concerns a method for instantiating (representative by a concrete instance) a class having different versions that is defined in an object-oriented programming language.

A (software) agent system essentially has two components, the agent platform and the agent itself. A monitoring and administration tool is often also present as a third component. An agent (also called a robot, wanderer or spider in the Internet) is a program that, equipped with the rights of a particular user, exists unsupervised for a time dependent on the concrete function to be fulfilled, and during this time can meet with other agents and work together with them. So that an agent does not paralyze computer systems in the manner of a virus, it must "identify" itself, and is permitted to have only a finite life span.

In general, two types of agents are distinguished. A stationary agent is executed by only one computer from the beginning of the program up to its end. In contrast, a mobile agent is executed by different computers at different times in its life cycle. An agent platform must exist on the computers that are supposed to be reachable for the agents. This agent platform provides the agent with, among other things, services for migration, (controlled) system access and message transmission and reception. The monitoring and administration tool enables the manual start of agents, the overview of data collected by agents and the display of other items of information concerning the agent system.

During its running time, a system of mobile agents can be distributed to many computers within a network. For this purpose, it is the case both that a platform is necessary at each (node) computer in the network, and that agents, data structures and message objects can move from computer to computer. If, in the course of the software life cycle, errors are detected in one of these (sub-) programs, or if parts of the software are changed for other reasons (e.g. improvement of algorithms, adaptation to changed environment, and, with limitations, change of function as well), then under some circumstances a termination, and, after the corresponding changes, a subsequent restart of the overall system can be required.

SUMMARY OF THE INVENTION

An object of the invention is to be able to carry out changes having different versions in system parts even during the running time of the software system, whereby these changes are gradually to come to prevail in the system as a whole.

According to the invention, a method is provided for instantiating a class having different versions defined in an object-oriented programming language. A computer network is provided in which computers are arranged in distributed fashion in a network connection, a platform for operation of mobile software agents being provided by each of the computers. In a first step 1a, if a particular version of an instantiatable class is requested, the requested version is used and a jump is made to a third step 1c. In a second step 1b, otherwise, using a newest version of the instantiatable class, the platform investigates whether the newest version is already locally available, and, if warranted, a jump is made to a fourth step 1d, otherwise, a class definition of a corresponding version is retrieved from a class file server and a jump is made to the fourth step 1d. In a third step 1c, if the class definition of the corresponding version is already locally available, the jump is made to the fourth step 1d, otherwise a search is made for the class definition, and if the class definition is found, a jump is made to the fourth step 1d, otherwise, the class is not instantiated. In the fourth step 1d, the class is instantiated according to a version to be used of the class definition.

The method of the invention thus makes it possible to carry out changes in system parts even during the running time, whereby these changes then spread out step-by-step in the overall system. A distinction between the different program parts is possible by integrating a version administration into the design of the dynamic updating. In this way, it is for example possible, given distributed software development, to integrate standardly used version administration systems and the information thus present concerning the different versions.

Java can be used as a programming language for implementing the mobile agent system. It is equally possible to use any other programming language that provides a dynamic loading of classes. Relevant expansions of programming languages, such as for example C++, are also conceivable.

According to the demands made, the classes for the platform, the agents and various objects referenced by them (among others, data structures and messages) should be versionable. By "platform" is meant, for example, any computer system that can act as a node in the network and that creates a program interface (operating software) for the (software) agents.

If changes are carried out in non-faulty classes, e.g. with respect to efficiency, the old versions of the objects should terminate their work as provided. There is thus the possibility of the simultaneous existence of objects of different versions alongside one another, which in turn reference objects of different versions. It is thus necessary to provide the old class definitions parallel to new class definitions, at least up to the "dying out" of all objects of one version, as well as of the objects referencing them. In faulty versions, in contrast, the possibility can be created of the annihilation of all objects of the old version as rapidly as possible after the importing of the new class.

For the selection of the respective "matching" version of the required class, a separate class loader mechanism is necessary.

The method of the invention for the dynamic updating, having different versions, of classes of a mobile agent system comprises the updating of the platform, the updating of classes having different versions, and the instantiation of an object of a class having different versions.

BRIEF DESCRIPTION OF THE DRAWINGS

FIG. 3 shows a block diagram representing the instantiation of an object of a versionable class.

DESCRIPTION OF THE PREFERRED EMBODIMENTS

Figure 4:
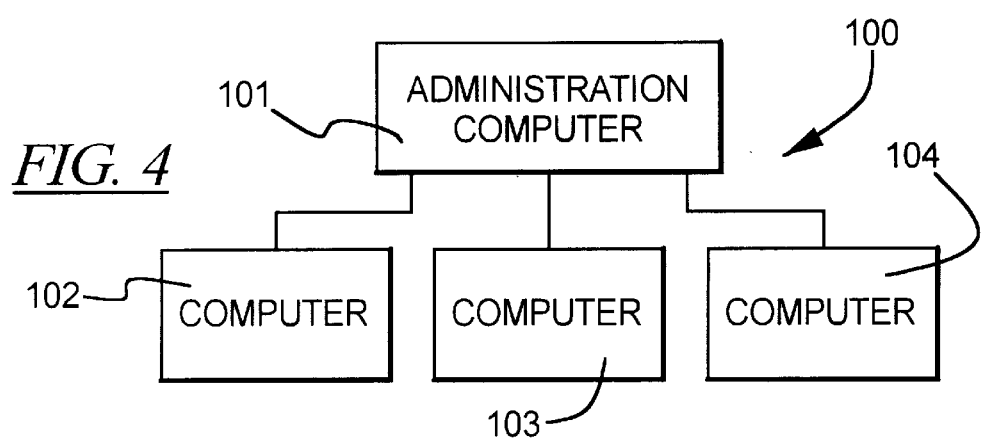
FIG. 4 shows a computer network providing platforms with which the method of the invention is implemented.

FIG. 4 shows the computer network 100 on which the method of the invention is implemented. The computer network 100, as is well known in the art, typically has an administration computer 101 providing an administration platform, and computers 102, 103, and 104 providing platforms.

Figure 1:
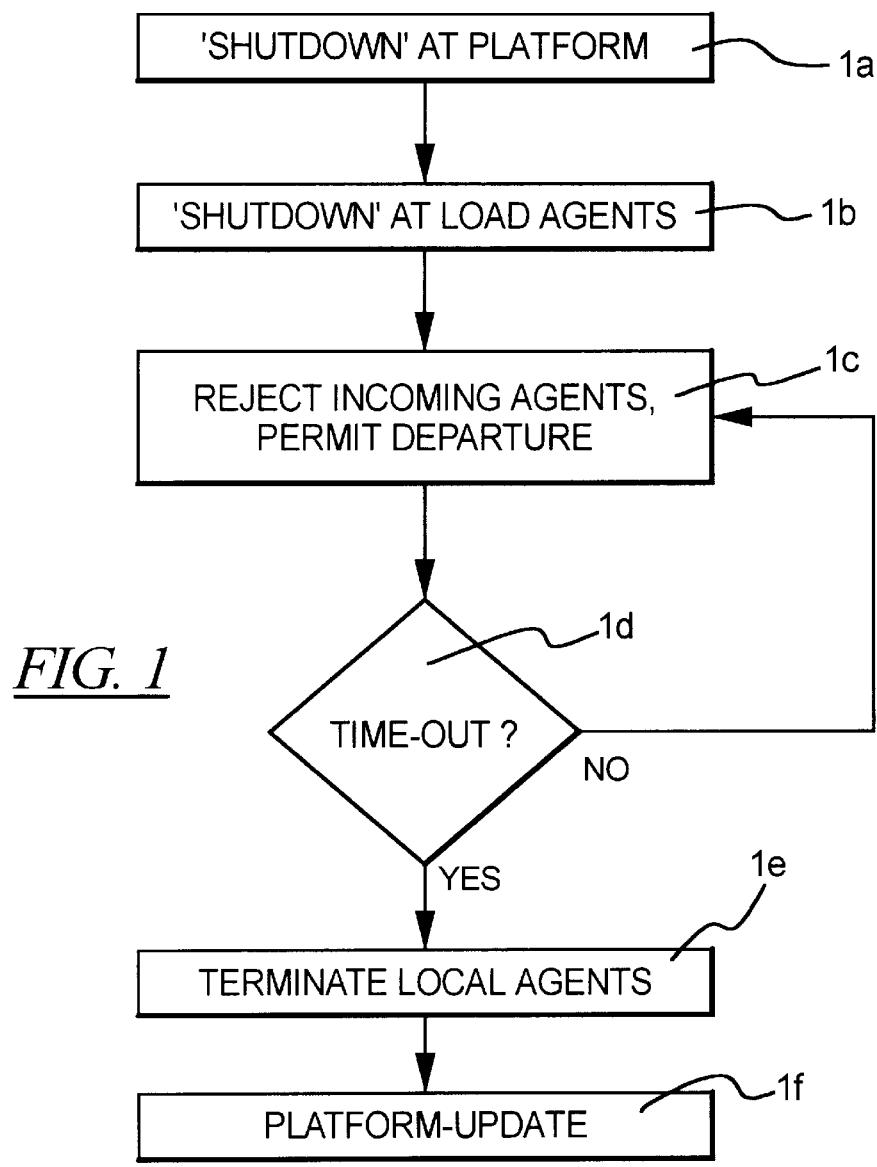
FIG. 1 shows a block diagram representing the updating of a platform.

FIG. 1 shows the possibility of sequentially initiating the updating of all platforms in the computer network system 100 of FIG. 4. It is thus important that there remains sufficient time for the agents to find an alternate possibility in the form of an adjacent platform. So that all methods of the respective platform used by other objects are also present in new platform versions, it is advantageous to determine precisely the programming interface of the platform, i.e. the signatures of the methods that can be used by other objects. Given an implementation in Java, this takes place by means of the definition of an 'interface' that implements every version of the platform.

The platform to be replaced receives a signal for shutdown (step 1a). A defined time interval, whose length is transmitted, for example, with the shutdown signal, defines the waiting time until the actual shutting down of the platform. It is advantageous to communicate the impending shutdown to the agents existing locally on this platform to be shut down (step 1b). All agents newly arriving on this platform are turned away, while a departure of agents (step 1c) is allowed. After the expiration of the time interval up to the shutting down of the platform (step 1d), the agents still existing locally on the platform are terminated (step 1e). Particularly important agents can thus be at least partially saved, so that they can be restarted after the updating of the platform. In addition, the data that are supposed to survive the shutdown of the platform are saved, e.g. data from the blackboard or counters for the labeling of messages. Finally, the updating of the platform is carried out (step 1f).

Figure 2:
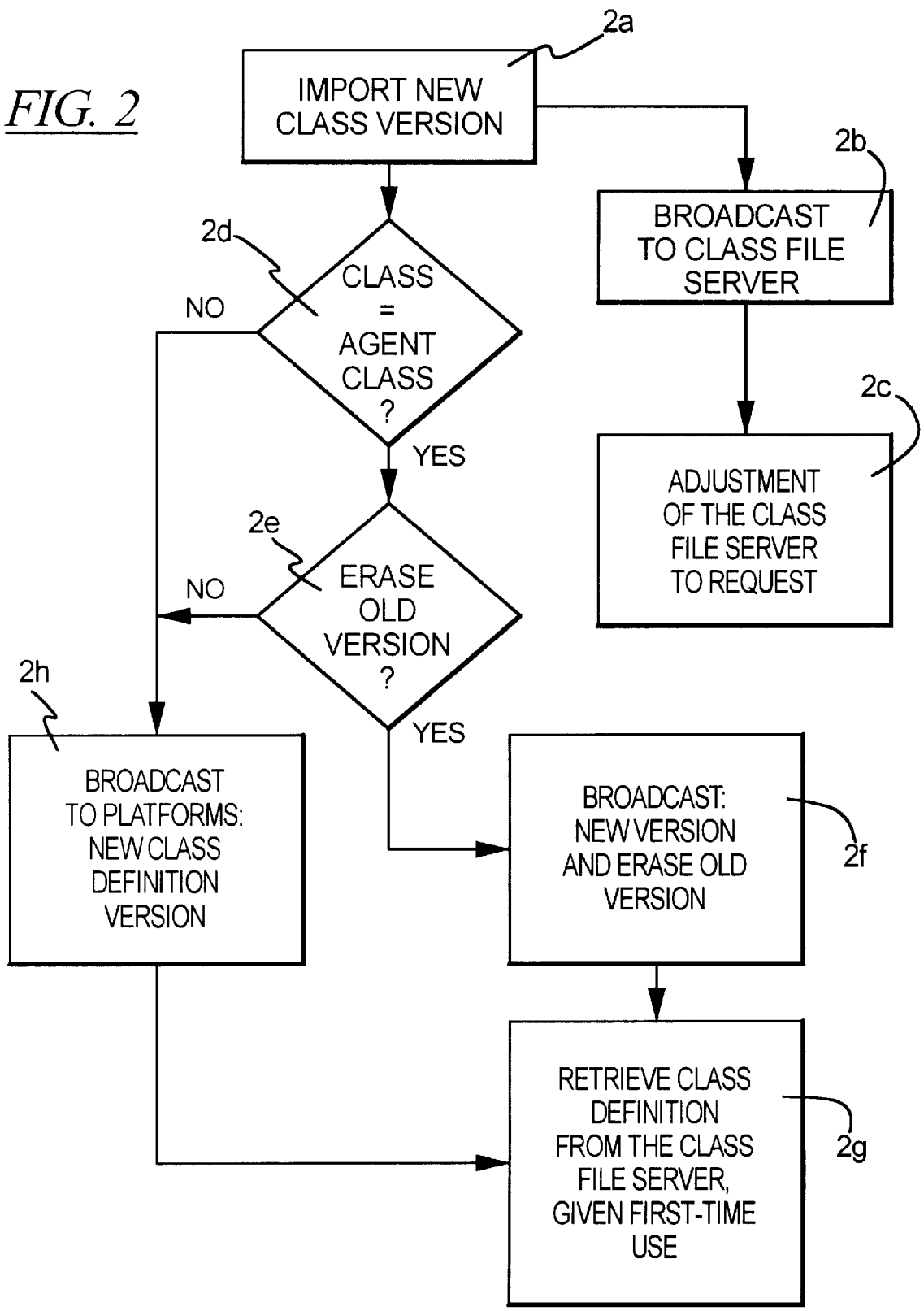
FIG. 2 shows a block diagram representing the updating of versionable classes.

FIG. 2 shows a block diagram for the updating of versionable classes. After the importing of a new version of a class definition (step 2a), all class file servers are informed of the existence of this new class version (step 2b). If later an agent of this class is newly produced, and its class definition is requested at the class file server without indicating a specific version, the most current version is always supplied and instantiated. It is thus ensured that the entire system is up-to-date. If the old version of the agent is to be destroyed (step 2e), e.g. because it is faulty, then a broadcast must be sent to all agents of this version to terminate themselves (step 2f). It is thereby to be checked whether, despite possible new data structures, the data of the old agents are to be saved so that they can be used by those of a new version. In the case of a simple change of function or expansion of the function of an agent, the old agents die out "naturally," since non-faulty programs can terminate their work as provided.

As mentioned above, there are classes that do not represent any abstract specification of agents or platforms. These classes stand, for example, for data structures. It is possible that the change of functioning of an agent also causes a change of the data structure it uses. Just as with the agent classes, when a new class of a different type is imported, the class server is informed via broadcast (step 2b). If later an object of this class is instantiated without the predetermination of a particular version, the most current version is always used. It is thereby ensured that objects (e.g. agents) that are not referred to a particular version of the objects referenced by them are always provided with the most up-to-date version of a class definition. The agents themselves (possibly also all other objects that reference versioned objects) keep a version table in which the version of a class is listed for each already-referenced (versionable) object. The class loader of the agent requests the class definition of the indicated version on the basis of this version table.

If, as shown in FIG. 2, a new class version is to be imported, then in step 2b the class file server is notified via broadcast of the existence of this new class version. The individual class file servers request the new class version from the administration platform whenever they require this information (on demand, step 2c).

If the new class version is not an agent class, the platforms are notified of the new class version via broadcast (steps 2d, 2h), and the class file servers retrieve the new class definition when an object of a class is generated for the first time (step 2g).

If the new class version is an agent class and if the old class version is supposed to be additionally provided (steps 2d, 2e), all platforms are notified of the new class version via broadcast (step 2h), and, when the object corresponding to the new class definition is instantiated for the first time, the respective platform retrieves this new class definition from the class file server (step 2g).

If the new class version is an agent class, and if the old class version is supposed to die (steps 2d, 2e), then all platforms are notified via broadcast of the new class version of the agent, and the death of the old agents is triggered (step 2f), whereby the agent data are saved as warranted. If the respective platform generates for the first time an agent with the new class version, the platform retrieves the class definition from the class file server (step 2g).

For the administration, i.e. for the importing of new class definitions and the erasing of old ones, there exist a few class file servers in the network, at which the class definition is present as a data file inside a particular directory structure. If a new version of a class is to be brought into the system, the corresponding data file is stored in the import directory of one of the class file servers by the administrator. It is thus advantageous to indicate to the import tool running on this computer (usable in the context of an administration and monitoring program) only the name of the stored class data file. From the indicated class data file, this tool generates the corresponding class instance by which an object of the class is instantiated. If, as in the example, an implementation in Java is assumed, then the version number anchored in the respective object can be determined by calling the method getVersion(), which supplies the version integrated into the source text by the version administration of the programming environment. The tool learns the real name of the class via the method getName() of the class instance, provided by Java for each class. After checking the already-present versions (do not import any old or already-present versions), the data file is copied into the corresponding directory, whereby the new data filename contains both the class name and the version number. By this means, the version numbers (assigned once by the version administration used in the software development) are automatically taken over, and use errors are thus reduced. An additional advantage of the version anchored in the class itself is the possibility of being able also to determine at a later time, without knowledge of the filename or of the version tables used in the system, the version of an object of a versionable class. In addition, the tool has the task of notifying the class server of the existence of new class definitions via broadcast.

A development of the method of the invention is that the new class definitions are respectively imported only to one of the class servers. However, the information concerning new class definitions is to be made equally accessible to all class file servers existing in the network, which requires an adjustment. After the importing of a new version of a class, an item of information concerning the new version of the class and concerning the class file servers provided to this class is transmitted to all class file servers in the network. The requesting of this class definition is left to the individual class file server itself. By means of this request mechanism it is ensured that as soon as a class file server learns of a new class definition, this definition can be requested by it.

FIG. 3 shows a block diagram for the instantiation of an object of a versionable class. In step 3a, it is assumed that an object of a versionable class is to be instantiated. If no particular version of the class definition is requested (step 3b), then according to standards the newest version of the class definition is used for the instantiation of the object (step 3c). If this newest class definition is already locally available on the platform (step 3d), the object is instantiated (step 3j); otherwise, the current class definition must be retrieved by the known class file server (step 3i) and the object is substantially instantiated (step 3j).

If, in contrast, a particular version of the class definition is requested for the instantiation of an object (step 3b), then, if the requested class definition is locally available on the platform (step 3e), the object is instantiated (step 3j); otherwise, according to the requested class definition a search takes place e.g. successively for a predecessor platform, an originating platform of the agent, and finally for the class file server (step 3f). If the requested class definition is not found (step 3g), the object cannot be instantiated (step 3h); otherwise, the object is instantiated in a manner corresponding to the version of the class definition to be used (step 3j).

Due to the broadcasts to the class file server, the current versions of the class definitions are respectively known to them. The version of the agent is prefixed to the message that transmits to the agents. This version is either locally present at the destination of the agent transport, or must be sought. The search for the class definition runs through three stages:

1. The platform of the agent sender, because the agent may have referenced an object of this class definition there, and the class definition may thus already be held in the memory of the sender platform,
2. the platform of the agent birthplace, since an object of this class definition may have been instantiated there, and, finally,
3. the class file server responsible for the local platform.

As an alternative to this, other search strategies can also be used; e.g., given the presence of a local class file server a search for the requested class definition can first take place therein, in order to avoid inquiries via the network.

In the exemplary embodiment, a separate class loader is instantiated for each agent, the loader having a version table of the classes already referenced. The agent itself also keeps a table of requested class versions. The version table of the class loader is filled with the entries of the version table of the agent upon arrival of the agent.

If an object referenced by the agent is now instantiated, it is checked in the version table of the agent whether an object of this class was already referenced, and, if so, which version this object is. If no object of this class was yet referenced previously, i.e., if this class is not listed in the version table of the agent, then the newest version that was made known to the platform via broadcast is used. If this version is not yet present in the memory of the platform, it is sought and loaded according to the above search strategy. In the version table of the agent, the class and the version of the class definition used are then entered.

By means of the mechanism contained in the method of the invention for administration of the versions of class definitions, it is ensured that agents can use objects of obsolete class definitions, or that agents of older versions can also be processed on a platform. Since error-free obsolete versions of agents or objects are in general supposed to terminate their task as provided, the old class definitions must be "canceled" for a certain time. All class definitions already required once are held in the memory by the platform. The existence of a mechanism that decides when to discard obsolete class definitions is thus advantageous. Thus, for example, an administrator could manually enable the different versions by means of the monitoring and administration tool. Another advantageous mechanism for decisions concerning obsolete class definitions is in the monitoring of the individual accesses to objects of versioned classes with a reference counter. If there exists a new version of the class, and the counter of the old version is equal to 0, the corresponding old class definition can be discarded. A third possibility is in the indication of a remaining life span for a class already during its importing, the life span deploying its effect after the occurrence of a new version of this class.

Although various minor changes and modifications might be proposed by those skilled in the art, it will be understood that our wish is to include within the claims of the patent warranted hereon all such changes and modifications as reasonably come within our contribution to the art.

We claim as our invention:

1. A method for instantiating a class having different versions defined in an object-oriented programming language, comprising the steps of:

providing a computer network in which computers are arranged in distributed fashion in a network connection, a platform for operation of mobile software agents being provided by each of said computers;

step 1a) if a particular version of an instantiatable class is requested, using the requested version and jumping to step 1c;

step 1b) otherwise, using a newest version of the instantiatable class, investigating with the platform whether the newest version is already locally available, and, if warranted, jumping to step 1d, otherwise, retrieving a class definition of a corresponding version from a class file server and jumping to step 1d);

step 1c) if the class definition of the corresponding version is already locally available, jumping to step 1d), otherwise searching for the class definition, and if the class definition is found, jumping to step 1d), otherwise, not instantiating the class; and step 1d) instantiating the class according to a version to be used of the class definition.

2. The method according to claim 1, wherein for updating of classes having different versions:

step 2a) importing a new version of a class to an administration platform;

step 2b) transmitting information concerning the new version of a class to class file servers;

step 2c) each individual class file server requesting the new class version from the administration platform, if it is required;

step 2d) if the new class is an agent class, jumping to step 2f);

step 2e) if the new class is not an agent class, transmitting information concerning the new version of the class to all platforms, and jumping to step 2h);

step 2f) if no agents are supposed to exist any longer with an old version of the agent class, jumping to step 2g) otherwise, transmitting the information concerning the new version of the class to all platforms and jumping to step 2h);

step 2g) notifying all platforms that a new version of the agent class is present, and destroying the agents of the old version;

step 2h) retrieving the class definition of the new version of the agent class from the class file server when instantiation takes place for a first time.

3. The method according to claim 2, wherein in addition, storing predeterminable agent data in step 2g) before the destruction of the agents.

4. The method of claim 1, wherein for updating of a platform:

step 3a) if a platform is to be updated, rejecting incoming agents, and allowing to depart only agents already present on the platform; and step 3b) after a predeterminable time span, terminating locally still-existing agents and carrying out the updating for the platform.

5. The method according to claim 4, wherein in addition to the updating of the platform in step 3b), previously storing important agents and data that are still determinable, and restoring the agents and data after the updating.

6. The method according to claim 1, wherein for step 1c), carrying out a search for the class definition successively on a predecessor platform, an originating platform of the agent and, finally, on the class file server.

7. The method according to claim 1, wherein an implementation is carried out in a programming language that enables dynamic loading of classes.

* * * * *